United States Patent
Blokland et al.

(10) Patent No.: US 11,460,291 B2
(45) Date of Patent: Oct. 4, 2022

(54) PROCESS FOR DETERMINING THE TOTAL PITCH DEVIATION OF A POSITION SENSOR

(71) Applicant: Aktiebolaget SKF, Gothenburg (SE)

(72) Inventors: Susanne Blokland, Turin (IT); Salah-Eddine Douih, Joué les Tours (FR); Mathieu Hubert, Turin (IT); Simon Hubert, Saint Cyr sur Loire (FR); Benedicte Thomas, Tours (FR); Charlotte Vu, Parçay Meslay (FR)

(73) Assignee: AKTIEBOLAGET SKF

( * ) Notice: Subject to any disclaimer, the term of this patent is extended or adjusted under 35 U.S.C. 154(b) by 48 days.

(21) Appl. No.: 17/104,194

(22) Filed: Nov. 25, 2020

(65) Prior Publication Data

US 2021/0164767 A1 Jun. 3, 2021

(30) Foreign Application Priority Data

Nov. 29, 2019 (IT) .......................... 102019000022428

(51) Int. Cl.
*G01D 5/12* (2006.01)
*G01B 7/30* (2006.01)

(52) U.S. Cl.
CPC ..................................... *G01B 7/30* (2013.01)

(58) Field of Classification Search
CPC ...... G01D 5/145; G01D 5/244; G01D 5/2448; G01R 33/07; G01B 7/30
See application file for complete search history.

(56) References Cited

U.S. PATENT DOCUMENTS

2003/0193120 A1 10/2003 Gegner
2012/0158341 A1* 6/2012 Ueda .................... G01D 5/2451
702/94

FOREIGN PATENT DOCUMENTS

| DE | 19840738 | 3/2000 |
|---|---|---|
| DE | 102017218880 | 5/2018 |
| EP | 2525110 | 11/2012 |
| JP | 2001289254 | 10/2001 |

OTHER PUBLICATIONS

International Search Report for corresponding Italian Patent Application No. 2019000022332 dated Aug. 21, 2020.

* cited by examiner

*Primary Examiner* — Alesa Allgood
(74) *Attorney, Agent, or Firm* — Reed Smith LLP (57) ABSTRACT

A process for determining the total pitch deviation of a position sensor fitted with a magnetic disk and a magnetic detector, the magnetic disk comprising pairs of magnetic poles, the process includes recording, over one mechanical turn, an angular signal of the magnetic intensity measured by the magnetic detector as a function of the angle of rotation of the magnetic disk, determining zero-crossing positions based on the angular signal recorded and the number of zero-crossing position determined, determining the pole pair lengths based on the zero-crossing positions, and determining the total pitch deviation based on the pole pair lengths.

10 Claims, 5 Drawing Sheets

---

Step 1 – Record an angular signal form a position sensor over one mechanical turn Step 2 – Determine zero-crossing positions Step 3 – Determine pole pair lengths Step 4 – Determine a total pitch deviation based on the pair pole lengths

PROCESS FOR DETERMINING THE TOTAL PITCH DEVIATION OF A POSITION SENSOR

CROSS REFERENCE OF RELATED APPLICATIONS

This application is based on and claims priority to Italian Application No. 102019000022428, filed Nov. 29, 2019, under 35 U.S.C. § 119, the entire contents of which are incorporated herein by reference.

FIELD

The present invention relates to processes for calibrating sensors, and particularly angular position sensors.

BACKGROUND

An absolute position sensor delivers an analogue sine shaped signal related to the rotor angular position. More precisely, such sensor comprises a rotor formed out of a magnetic ring fitted with magnetic poles and a stator fitted with a magnetic sensor, able to detect the magnetic field of each magnetic pole.

DESCRIPTION OF THE DRAWINGS

The present invention will be better understood from studying the detailed description of a number of embodiments considered by way of entirely non-limiting examples and illustrated by the attached drawing in which.

DETAILED DESCRIPTION

When rotation is applied to the rotor, the magnetic poles pass successively in front of the magnetic sensor. A current is induced within the magnetic sensor based on its distance to the magnetic poles. The current forms a periodic signal, sine shaped, function of time, wherein the intensity of the signal depends on the distance between the magnetic sensor and the magnetic poles. The time dependency can be converted into an angular dependency based on the known geometry of the sensor and the rotation speed. It is therefore possible to link time with angular position of the rotor and to obtain a sine signal linking intensity with angular position.

Such absolute position sensors may be used in motor control. In the particular case of belt starter generators, the requirement on sensor output signals accuracy is more and more important, due to the fact that the machine torque needs to be properly controlled with the least amount of noise. Moreover, the level of oscillating current of the battery must remain under a fixed limit in order to avoid degrading the overall performance of the vehicle.

One of the sources of sensor output inaccuracy is the magnetic ring itself, as it does not give a perfect image of the rotor position. This is caused by the fact that a delivered magnetic field signal of such a magnetic ring embodiment is not a perfect sine wave and by the fact that any individual period of the sine wave might have a different length.

To better characterize a magnetic ring, the total pitch deviation parameter, named TPD, can be used. It evaluates the cumulative error on the position of a magnetic ring by measuring a single pitch deviation for each ring pole.

An interval is defined as an angular distance between two nearest poles of same polarity. A general method to calculate TPD is described by the following equations:

Single pitch deviation error SPD for interval i can be calculated in accordance with this formula:

$$SPD(i) = \frac{P_{Theoretical} - P_{real}(i)}{P_{Theoretical}} \times 100 \quad \text{[Math 1]}$$

wherein:

PTheoretical: Theoretical period of the angular signal for an interval

Preal(i): Actual period of the angular signal for interval i.

It is to be noted that actual period Preal(i) is to be determined between poles of same sign, i.e., between North poles or between South poles. Similarly, the actual period Preal(i) is to be determined between the same kind of signal edges, i.e., between rising edges or between falling edges.

Cumulative pitch deviation error TPD(i) for interval i can be calculated on the basis of the formula:

$$TPD(i) = \sum_{n=1}^{n=i} SPD(n) \quad \text{[Math 2]}$$

Total pitch deviation error TPD on a mechanical turn can be calculated on the basis of the formula:

$$TPD = \max\left(\sum_{i=1}^{i=Nbpp} SPD(i)\right) - \min\left(\sum_{i=1}^{i=Nbpp} SPD(i)\right) \quad \text{[Math 3]}$$

wherein Nbpp: Number of intervals in a mechanical turn.

For example, an angular signal is generated by a sensor over 1.3 mechanical turn comprising over 324000 points, out of which 81000 are natively measured, the remaining being interpolated.

Zero-crossing samples present in the angular signal are determined. A zero-crossing sample is equal to the nearest points of the angular signal, each apart a crossing by the angular signal of a zero intensity level measured by the sensor. The zero intensity level is in the direction measured by the sensor, i.e., normal direction for a Hall Effect sensor.

Out of each zero-crossing sample, an angular position of zero-crossing is determined.

The method then comprises a calculation of the lengths of the pole pairs in degrees starting by both rising edge and falling edge.

The lengths of the pole pairs are then compared to the theoretical pole length, for determination of a pitch error, as a percentage of the theoretical pole length.

A sum of all pitch errors over one mechanical turn is determined. Then a recording of the peak-to-peak value over pole pairs is performed.

There is a problem determining the TPD from a noisy angular signal.

An object of embodiments in accordance with this disclosure is a process for determining a total pitch deviation of a position sensor fitted with a magnetic disk and a magnetic detector; a magnetic disk comprising pairs of magnetic poles. A process in accordance with this disclosure comprises the following steps:
- recording, over one mechanical turn, an angular signal of an magnetic intensity measured by a magnetic detector as a function of an angle of rotation of the magnetic disk,
- determining zero-crossing positions based on a recorded angular signal and a number of zero-crossing position determined,
- determining a pole pair lengths based on the zero-crossing positions, and
- determining a total pitch deviation based on the pole pair lengths.

In order to determine zero-crossing positions based on a recorded angular signal, steps can be performed as follows:
- determining zero-crossing samples within an angular signal, and determining zero-crossing positions out of the determined zero-crossing samples,
- generating a zero-crossing signal wherein its intensity at a zero-crossing angular position equal to a difference between a maximum zero-crossing sample and a minimum zero-crossing sample, each apart from a zero-crossing angular position, the zero-crossing signal being equal to zero elsewhere,
- determining a number of zero-crossing positions in at least a predefined range of angular positions by averaging values of the zero-crossing signal over said at least a predefined range,
- filtering the angular signal within the predefined ranges of angular positions comprising a number of zero-crossing positions greater than a threshold, in order to reduce their number,
- applying linear interpolation to each zero-crossing sample,
- determining an actual zero-crossing position based on all the zero-crossing positions within an interval so as to avoid outliers to deviate the result, an interval being defined as an angular distance between two nearest poles of same polarity.

The recalculated zero-crossing position can be determined with a method chosen among median, mean, weighted sum, zero-crossing of linear polynomial fit using measured percentage samples around zero, middle of min/max measured zero-crossing positions.

The step of filtering an angular signal in order to reduce a number of zero-crossing position can also be applied if overlapping of zero-crossing samples is not detected A standard deviation on a recalculated zero-crossing position can be determined, and if a standard deviation is greater than a predetermined value, a warning can be given to the user.

Different methods can be applied to different intervals.

In order to determine the pole pair lengths based on zero-crossing positions, the following steps can be performed:
- performing a pre-treatment of an angular signal comprising a recalculated zero-crossing positions depending of an intensity and an a rate of change of the angular signal at a beginning of a recording in regard to a first zero-crossing position,
- determining a length in degrees of each pole as a difference between an angular position associated with a rising edge and an angular position associated with a falling edge of the angular signal, and zero-crossing positions associated with said rising edge and falling edge,
- determining a pole pair lengths as a sum of lengths of adjacent positive and negative poles within a pole pair.

In order to perform a pre-treatment of the angular signal, steps may be performed as follows:
- when determining an angular signal begins at a zero-crossing position with an increasing intensity, no treatment is performed,
- when determining the angular signal does not begin at a zero-crossing position with an increasing intensity, determining a first zero-crossing position with an increasing intensity, and
- moving a part of the angular signal from a beginning of the signal to a first zero-crossing position with an increasing intensity at an end of the angular signal.

In order to determine a total pitch deviation based on pole pair lengths, steps may be performed as follows:
- calculating a pitch error as a difference between a determined pole pair length and a theoretical pole pair length as a percentage of the theoretical pole pair length, the theoretical pole pair length being determined from a structure of a sensor magnetic disk,
- determining a cumulated of pole pair length errors for each pole pair length over one mechanical turn, and
- determining minimum and maximum values of cumulative pole pair length errors, and
- determining a total pitch deviation of the magnetic disk by subtracting a minimum value of cumulated pole pair length errors out of a maximum value of cumulative pole pair length errors.

Interpolation can be used to increase the number of recorded points.

A determination method in accordance with this disclosure presents the following advantages.

These determination methods do not require an encoder with a high number of native points or an interpolation stage which induces additional error. A linear interpolation performed within an algorithm to find zero-crossing positions can be used instead, reducing costs and volume.

These determination methods are robust against noisy angular signals.

Corresponding calculations are performed on a full mechanical turn, which corresponds to an actual angular length of the magnetic ring.

Using rising or falling edge to calculate TPD value can give different indication on magnetization yoke design (zero-crossing accuracy, coil arrangement, magnetic eccentricity, and the like).

Figure 1:
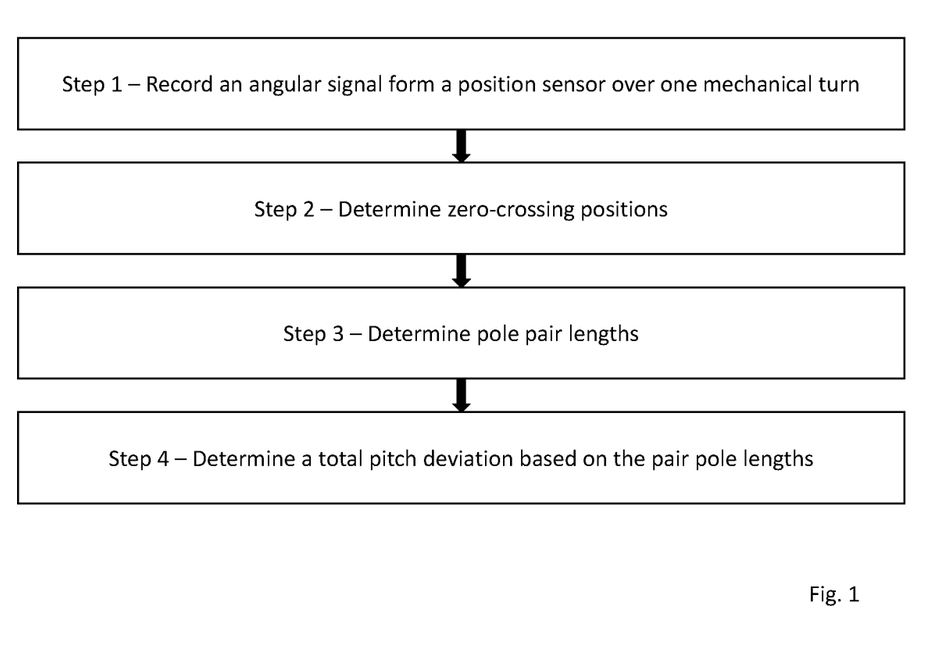
FIG. 1 shows the main steps of a process according to the invention.

A process for determining the TPD of a position sensor illustrated by FIG. 1 comprises the following steps:

During a first step 1, an angular signal from a position sensor is recorded over one mechanical turn in order to generate a number of sampled points. In embodiments at least 18000 sampled points are generated. In some embodiments, interpolation can be used to increase the number of points. An angular signal is a periodic signal whose intensity varies as a function of a cumulated angle of rotation since accumulated since a beginning of recording. It is to be noted that the angular signal results from the recording of the magnetic intensity detected by the magnetic sensor due to the passing of the magnetic disc pole pairs.

A cumulated angle of rotation is determined by an encoding device comprising an encoding disk and a pickup sensor. The coding disk comprises a plurality of encoders precisely spaced at fixed angles. Each time a coder is detected by the pickup sensor, the magnetic field is acquired.

An acquisition of magnetic intensity at fixed angle is guaranteed by this arrangement independently of any increase or decrease of the rotation speed. Such an acquisition cannot be achieved with a clock-based arrangement wherein a magnetic field acquisition is performed after a preset duration has lapsed. Any increase or decrease of a rotational speed yields a change in the angular position of the acquisition.

During a second step 2, zero-crossing positions are determined based on an angular signal recorded. Steps 2a to 2d allow for such a determination.

Figure 2:
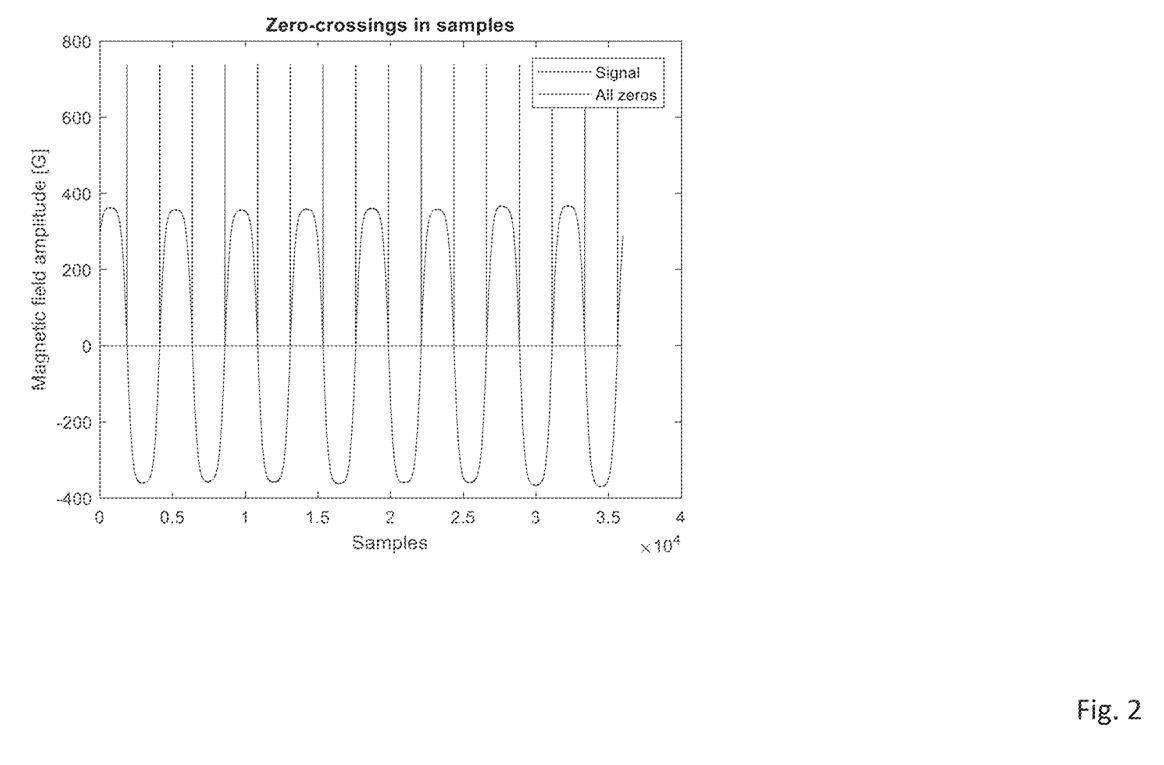
FIG. 2 shows both a theoretical angular signal and the corresponding zero-crossing signal.

In a step 2a, zero-crossing samples are determined within the angular signal, and zero-crossing positions are determined out of the zero-crossing samples. A zero-crossing signal is then generated wherein its intensity at a zero-crossing angular position equals to the difference between the maximum of the zero-crossing sample and the minimum of the zero-crossing sample, each apart from the zero-crossing angular position. The zero-crossing signal is equal to zero elsewhere. FIG. 2 illustrates both a theoretical angular signal and the corresponding zero-crossing signal.

It is reminded that a zero-crossing position corresponds to the angular position wherein the angular signal crosses a base level with a zero intensity. In some embodiments, the base level can present an offset which is deleted before the calculation start.

Due to the presence of noise on the angular signal, a zero-crossing position within the angular signal can differ from the physical position of the magnetic disk in regard to the sensor theoretically corresponding to a zero-crossing position. More precisely, in such conditions, multiple zero-crossing positions can appear within an interval.

In a step 2b, the number of zero-crossing positions within at least a predefined range of angular positions is determined by averaging the value of the zero-crossing signal within said at least a predefined range. The number of zero-crossing positions within each predefined range of angular positions is compared to a predefined threshold. A range is considered comprising a large concentration of zero-crossing positions if the number of zero-crossing positions it contains is greater than the threshold.

Filtering is then applied to the angular signal within the ranges of angular position comprising a large concentration of zero-crossing positions, in order to reduce their number.

These ranges are also checked for overlapping of zero-crossing samples in order to determine if the step of filtering the angular signal is to be applied. Overlapping happens when a part of a zero-crossing sample coincides with a part of another zero-crossing sample. Such an overlapping means the angular signal is too noisy or does not comprise enough samples per interval.

If overlapping of zero-crossing samples is detected, an error message is returned and the calculation is stopped.

In a step 2c, linear interpolation is applied to each zero-crossing sample. If there is noise on the angular signal, there can be multiple solutions per interval.

In a step 2d, if it is determined that multiple zero-crossing positions have been determined in an interval, an actual zero-crossing position is recalculated based on all the zero-crossing positions of the interval. In an embodiment, the recalculated zero-crossing position is determined so as to avoid outliers to deviate the result.

More precisely, the recalculated zero-crossing position is determined with a method chosen among median, mean, weighted sum, zero-crossing of linear polynomial fit using measured % samples around zero, middle of min/max measured zero-crossing positions. Those methods are calculated, then a standard deviation on the results of all the methods is determined. If the standard deviation is too high, a warning is given to the user.

Different methods can be applied to different intervals.

In a third step 3, the pole pair lengths are determined. The steps ranging from step 3a to step 3c enable such a determination.

In a step 3a, a pre-treatment of the angular signal comprising the recalculated zero-crossing positions is performed depending of the intensity and of the rate of change of the angular signal at the beginning of a recording in regard to the first zero-crossing position. The different cases of angular signal pre-treatment will be described further below.

In a step 3b, the length in degrees of each pole is determined as the difference between the angular position associated with a rising edge and the angular position associated with a falling edge of the angular signal, and the zero-crossing positions associated with said rising edge and falling edge.

In a step 3c, the pole pair lengths are then determined as the sum of the lengths of adjacent positive and negative poles within a pole pair.

In a fourth step 4, a TPD is determined based on the pole pair lengths. The steps ranging from step 4a to step 4c enable such a determination.

In a step 4a, the pitch error is calculated as the difference between the determined pole pair length and the theoretical pole pair length as a percentage of the theoretical pole pair length. The theoretical pole pair length is determined from the structure of the sensor magnetic disk.

At a step 4b, a cumulation of pole pair length errors is determined for each pole pair length over one mechanical turn by applying equation [Math 2]. A vector of TPD(i) values is then obtained.

At a step 4c, minimum and maximum values of cumulative pole pair length errors are determined, then TPD of the magnetic disk in determined out of minimum and maximum values of cumulative pole pair length errors by applying equation [Math 3]. A single value of TPD is obtained.

The different cases of signal pre-treatment performed at step 3a will now be described. They are described below focusing on calculation using the rising edge. The same principle applies when using the falling edge.

Figure 3:
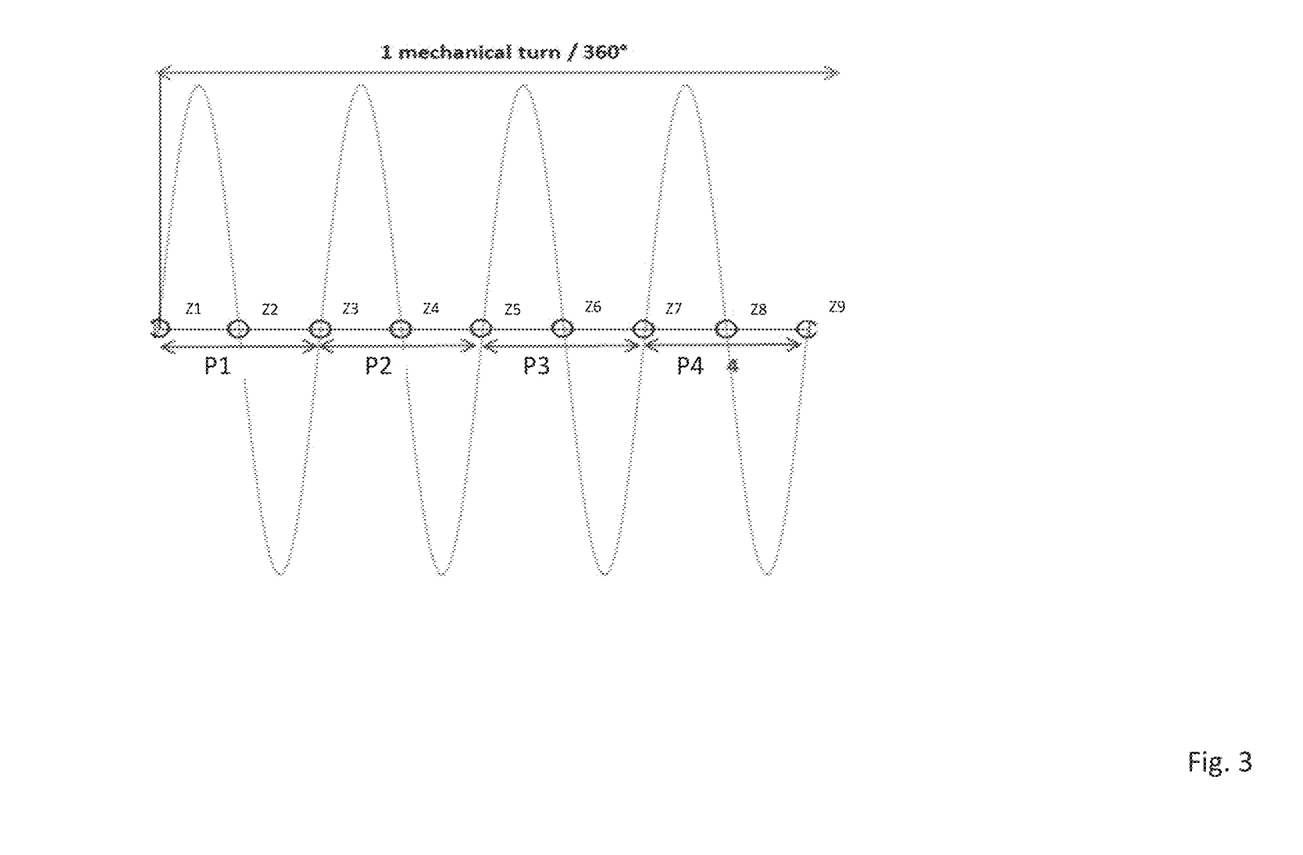
FIG. 3 shows a first angular signal.

A first signal illustrated by FIG. 3 results from an acquisition starting at the beginning of a period with a zero-crossing position Z1 and a positive rate of change. In other words, the recording begins with a pole pair in front of the magnetic sensor within the position sensor.

The calculation of the pole pair lengths is then performed as follows:

$$\begin{cases} \text{pole pair length } P1 = \text{zero crossing } Z3 - \text{zero crossing } Z1 \\ \text{pole pair length } P2 = \text{zero crossing } Z5 - \text{zero crossing } Z3 \\ \text{pole pair length } P3 = \text{zero crossing } Z7 - \text{zero crossing } Z5 \\ \text{pole pair length } P4 = \text{zero crossing } Z9 - \text{zero crossing } Z7 \end{cases}$$

It is rare to get such a signal in practical measurements.

Figure 4:
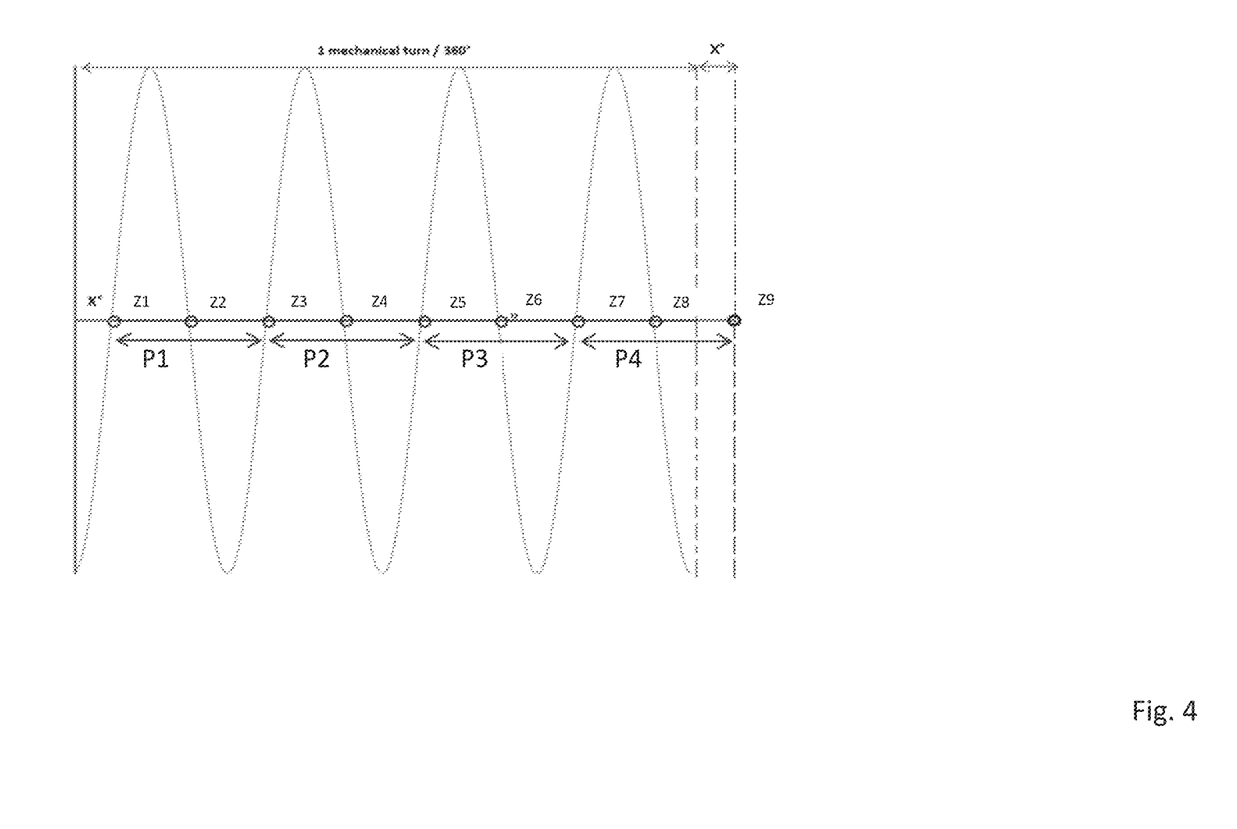
FIG. 4 shows a second angular signal and the pre-treatment applied.

A second signal illustrated by FIG. 4 results from an acquisition starting as the magnetic field is increasing before a zero-crossing position.

In this case, the part of the signal comprising the last zero-crossing Z9 is obtained by moving the part X° of the angular signal before the first zero-crossing at the end of the recording. This move has the effect of shifting the angular signal recording on a mechanical turn in order to align the beginning of the angular signal with a zero-crossing position and a positive rate of change. In other words, the resulting angular signal is similar to the first signal described above.

The calculation of the pole pair lengths is then performed as follows:

$$\begin{cases} \text{pole pair length } P1 = \text{zero crossing } Z3 - \text{zero crossing } Z1 \\ \text{pole pair length } P2 = \text{zero crossing } Z5 - \text{zero crossing } Z3 \\ \text{pole pair length } P3 = \text{zero crossing } Z7 - \text{zero crossing } Z5 \\ \text{pole pair length } P4 = \text{zero crossing } Z9 - \text{zero crossing } Z7 \end{cases}$$

Figure 5:
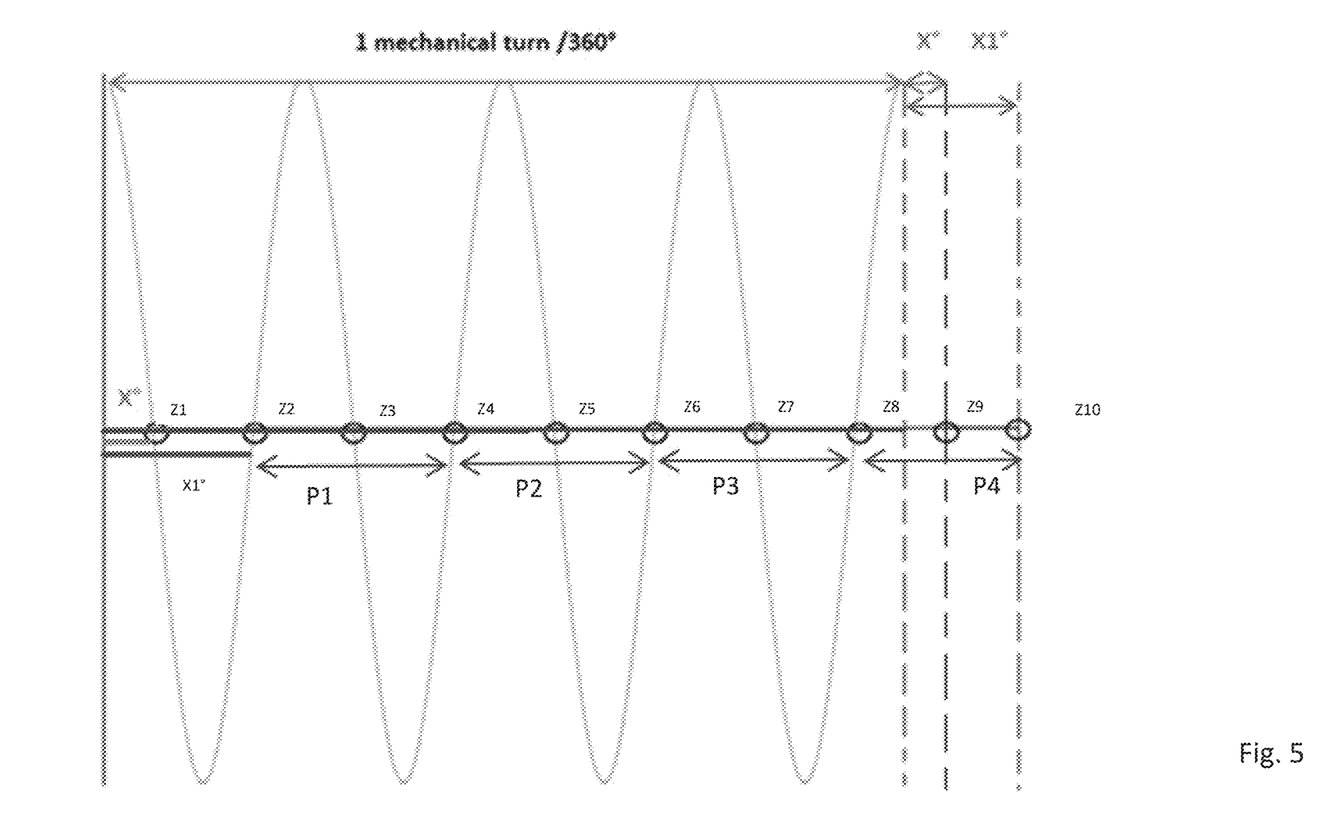
FIG. 5 shows a third angular signal and the pre-treatment applied.

A third signal illustrated by FIG. 5 results from an acquisition starting as the magnetic field is decreasing.

In this case, the part X1° of the signal comprising the two last zero-crossing positions (Z9, Z10) are obtained by moving the part of the signal comprising the two first zero-crossing positions (Z1,Z2) at the end of the recording. Similarly to the second signal, this move has the effect of shifting the angular signal recording on a mechanical turn in order to align the beginning of the angular signal with a zero-crossing position and a positive rate of change. In other words, the resulting angular signal is similar to the first signal described above.

The calculation of the pole pair lengths is then performed as follows:

$$\begin{cases} \text{pole pair length } P1 = \text{zero crossing } Z4 - \text{zero crossing } Z2 \\ \text{pole pair length } P2 = \text{zero crossing } Z6 - \text{zero crossing } Z4 \\ \text{pole pair length } P3 = \text{zero crossing } Z8 - \text{zero crossing } Z6 \\ \text{pole pair length } P4 = \text{zero crossing } Z10 - \text{zero crossing } Z8 \end{cases}$$

The process described above enables the determination of a TPD value even with a noisy signal. Moreover, the TPD value obtained is representative of the actual pitch between the angular signal and placement of the pole pairs.

What follows are certain exemplary non-limiting embodiments of a process for determining a TPD.

A process for determining the total pitch deviation of a position sensor fitted with a magnetic disk and a magnetic detector, the magnetic disk comprising pairs of magnetic poles, the process comprising the following steps: recording, over one mechanical turn, an angular signal of the magnetic intensity measured by the magnetic detector as a function of the angle of rotation of the magnetic disk, determining zero-crossing positions based on the angular signal recorded and the number of zero-crossing position determined, determining the pole pair lengths based on the zero-crossing positions, and determining the total pitch deviation based on the pole pair lengths.

A process as above, wherein, in order to determine zero-crossing positions based on the recorded angular signal, the following steps are performed: determining zero-crossing samples within the angular signal, and determining zero-crossing positions out of the zero-crossing samples, generating a zero-crossing signal wherein its intensity at a zero-crossing angular position equals to the difference between the maximum of the zero-crossing sample and the minimum of the zero-crossing sample, each apart from the zero-crossing angular position, the zero-crossing signal being equal to zero elsewhere, determining the number of zero-crossing positions in at least a predefined range of angular positions by averaging the value of the zero-crossing signal over said at least a predefined range, filtering the angular signal within the predefined ranges of angular positions comprising a number of zero-crossing positions greater than a threshold, in order to reduce their number, applying linear interpolation to each zero-crossing sample, determining an actual zero-crossing position based on all the zero-crossing positions within an interval so as to avoid outliers to deviate the result, an interval being defined as the angular distance between two nearest poles of same polarity.

A process as above, wherein the recalculated zero-crossing position is determined with a method chosen among median, mean, weighted sum, zero-crossing of linear polynomial fit using measured percentage samples around zero, middle of min/max measured zero-crossing positions.

A process as above, wherein, the step of filtering the angular signal in order to reduce the number of zero-crossing position is also applied if overlapping of zero-crossing samples is not detected.

A process as above, wherein a standard deviation on the recalculated zero-crossing position is determined, and if the standard deviation is greater than a predetermined value, a warning is given to the user.

A process as above, wherein different methods are applied to different intervals.

A process as above, wherein, in order to determine the pole pair lengths based on zero-crossing positions, the following steps are performed: performing a pre-treatment of the angular signal comprising the recalculated zero-crossing positions depending of the intensity and of the rate of change of the angular signal at the beginning of a recording in regard to the first zero-crossing position, determining the length of each pole as the difference between the angular position associated with a rising edge and the angular position associated with a falling edge of the angular signal, and the zero-crossing positions associated with said rising edge and falling edge, determining the pole pair lengths as the sum of the lengths of adjacent positive and negative poles within a pole pair.

A process as above, wherein, in order to perform a pre-treatment of the angular signal, the following steps are performed: determining if the angular signal begins at a zero-crossing position with an increasing intensity, if such is the case, no treatment is performed, if the angular signal does not begin at a zero-crossing position with an increasing intensity, determining the first zero-crossing position with an increasing intensity, and moving the part of the angular signal from the beginning of the angular signal to the first zero-crossing position with an increasing intensity at the end of the angular signal.

A process as above, wherein, in order to determine the total pitch deviation based on the pole pair lengths, the following steps are performed: calculating the pitch error as the difference between the determined pole pair length and the theoretical pole pair length as a percentage of the theoretical pole pair length, the theoretical pole pair length being determined from the structure of the sensor magnetic disk, determining a cumulation of pole pair length errors for each pole pair length over one mechanical turn, and determining minimum and maximum values of cumulative pole pair length errors, then determining the total pitch deviation of the magnetic disk by subtracting the minimum value of cumulative pole pair length errors out of the maximum value of cumulative pole pair length errors.

A process as above, wherein interpolation is used to increase the number of recorded points.

What is claimed:

1. A process for determining a total pitch deviation of a position sensor fitted with a magnetic disk and a magnetic detector, the magnetic disk comprising at least one pair of magnetic poles, comprising:
   recording, over one mechanical turn, an angular signal of a magnetic intensity measured by the magnetic detector as a function of an angle of rotation of the magnetic disk;
   determining zero-crossing positions based on the angular signal recorded and a total number of zero-crossing position determined;
   determining a plurality of pole pair lengths based on the zero-crossing positions; and
   determining a total pitch deviation based on the plurality of pole pair lengths compared to a theoretical pole length,
   wherein the theoretical pole length is determined from a structure of the magnetic disk.

2. The process of claim 1, wherein, determining the total pitch deviation based on the pole pair lengths further comprises:
   calculating a pitch error as a difference between the determined pole pair length and the theoretical pole pair length as a percentage of the theoretical pole pair length;
   determining a cumulative pole pair length error for each pole pair length over one mechanical turn;
   determining a minimum and a maximum value of the cumulative pole pair length; and
   subtracting the minimum value of the cumulative pole pair length from the maximum value of the cumulative pole pair length error.

3. The process of claim 1, wherein interpolation is used to increase the number of recorded points.

4. The process of claim 1, wherein, determining zero-crossing positions based on the angular signal further comprises:
   determining zero-crossing samples within the angular signal, and determining the zero-crossing positions out of the zero-crossing samples;
   generating a zero-crossing signal wherein an intensity at a zero-crossing angular position equals a difference between a maximum of the zero-crossing sample and a minimum of the zero-crossing sample, each apart from the zero-crossing angular position, the zero-crossing signal being equal to zero elsewhere;
   determining the total number of zero-crossing positions in at least a predefined range of angular positions by averaging a value of the zero-crossing signal over the predefined range;
   filtering the angular signal within the at least one predefined range of angular positions comprising a number of zero-crossing positions greater than a threshold, in order to reduce their number;
   applying linear interpolation to each zero-crossing sample; and
   determining an actual zero-crossing position based on the zero-crossing positions within an interval so as to avoid outliers to deviate a result,
   wherein the interval is defined as an angular distance between two nearest poles of a same polarity.

5. The process of claim 4, wherein no overlap of the zero crossing samples is detected.

6. The process of claim 4, further comprising :
   determining a standard deviation of the recalculated zero-crossing position;
   generating a warning to a user if the standard deviation exceeds a predetermined value.

7. The process of claim 4, further comprising determining a recalculated zero crossing position, wherein the recalculated zero-crossing position is determined by generating one or more methods chosen from a median, a mean, a weighted sum, a zero-crossing of a linear polynomial fit using measured percentage samples around zero, and a middle of min/max measured zero-crossing positions.

8. The process of claim 7, wherein different methods of the one or more methods are applied to more than one different intervals.

9. The process of claim 1, wherein determining the pole pair lengths based on zero-crossing positions further comprises:
   performing a pre-treatment of the angular signal based on an intensity and a rate of change of the angular signal at a beginning of a recording in regard to a first zero-crossing position, wherein the angular signal comprises a recalculated zero-crossing position;
   determining a length of each pole as a difference between an angular position associated with a rising edge of the angular signal and an angular position associated with a falling edge of the angular signal, and the zero-crossing positions associated with the rising edge and the falling edge; and
   determining the pole pair lengths as the sum of a length of a negative pole and an adjacent positive pole within a pole pair.

10. The process of claim 9, wherein performing a pre-treatment of the angular signal comprises:
   determining if the angular signal begins at a zero-crossing position with an increasing intensity; and
   if the angular signal begins at a zero-crossing position with an increasing intensity, performing no treatment,
   if the angular signal does not begin at a zero-crossing position with an increasing intensity,
      determining a first zero-crossing position with an increasing intensity; and
      moving a part of the angular signal from a beginning of the angular signal to the first zero-crossing position with an increasing intensity at an end of the angular signal.

* * * * *